E. C. BROOKS.
Milk-Coolers.

No. 146,428. Patented Jan. 13, 1874.

Witnesses
Edmund Masson
John R. Young

Inventor
E. C. Brooks, by
Prindle and his Atty's

UNITED STATES PATENT OFFICE.

EDWIN C. BROOKS, OF NORWICH, NEW YORK.

IMPROVEMENT IN MILK-COOLERS.

Specification forming part of Letters Patent No. 146,428, dated January 13, 1874; application filed February 14, 1873.

*To all whom it may concern:*

Be it known that I, EDWIN C. BROOKS, of Norwich, in the county of Chenango and in the State of New York, have invented certain new and useful Improvements in Milk-Coolers; and do hereby declare that the following is a full, clear, and exact description thereof, reference being had to the accompanying drawing making a part of this specification, in which—

Figure 1:
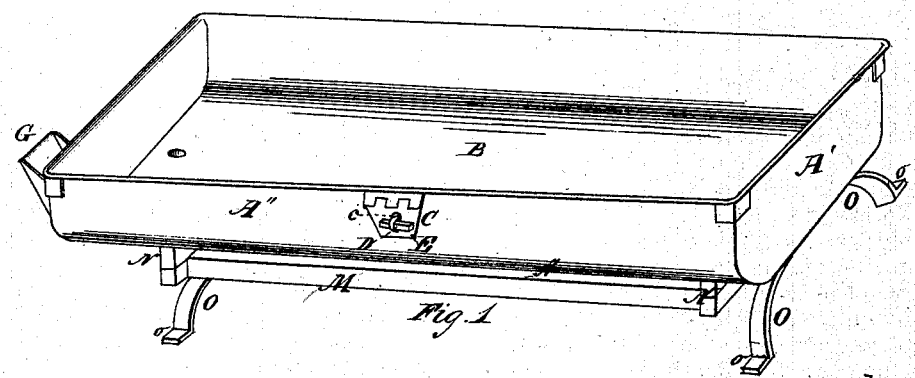
Figure 3:
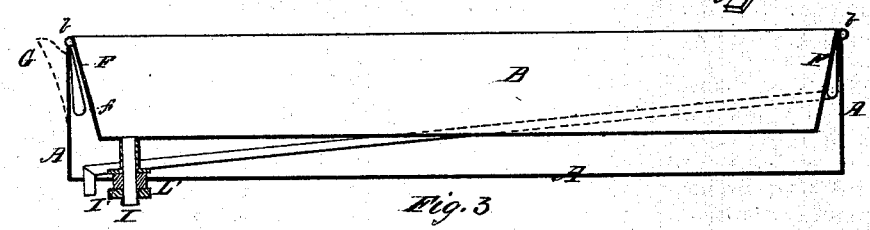
Figure 2:
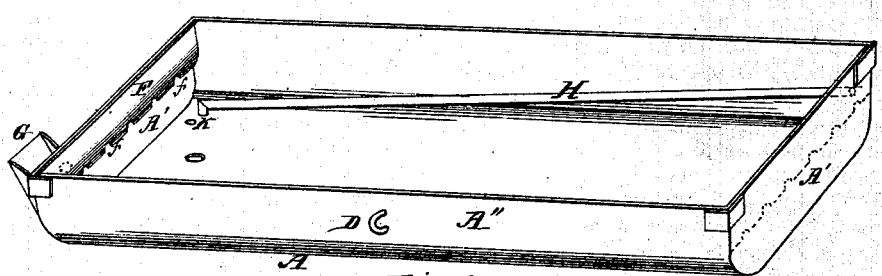
Figure 4:
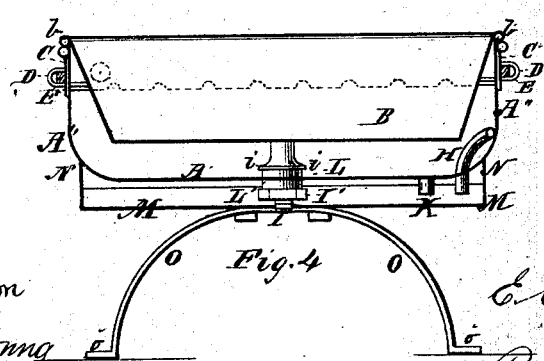

Figure 1 is a perspective view of my device complete and ready for use. Fig. 2 is a like view of the outer pan separate from the inner or milk pan. Fig. 3 is a vertical longitudinal section upon a central line, and Fig. 4 is a central cross-section of said device.

Letters of like name and kind refer to like parts in each of the figures.

My invention is an improvement upon a class of apparatus designed for containing milk and for enabling an even temperature of the same to be preserved; and it consists in the peculiar arrangement of the water and milk pipes and their construction and adaptation to the pans. It consists, further, in the construction of the supporting-frame and its combination with the vat, substantially as and for the purpose hereinafter shown and described.

In the annexed drawing, A represents the outer or water pan, having vertical ends A' and sides A'', and round corners at the intersection of the latter and the bottom. A second pan, B, having the same general shape as that described, except that its sides and ends incline slightly inward and downward, is fitted within said pan A, and, by means of an outward-projecting ledge, b, provided at its upper edge, embraces the upper edge of said outer pan, and is supported by the same. A hasp, C, hinged to or upon each side and edge of the inner pan B, at its longitudinal center, is provided with a vertical slot, c, and, when turned downward against the outer side of the outer pan, passes over and engages with a staple, D, which is secured to and extends outward from the latter. A pin, E, passed through said staple outside of said hasp, locks the latter in place, and, in combination with the hasp upon the opposite side, unites said pans firmly together. Extending across the inner side of each end A' of the outer pan A is a pipe, F, which is formed by means of a metal plate that is soldered at its upper edge to or upon the corresponding part of said pan, and, extending downward and slightly outward, has its lower edge curved under and outward against said end A', to which it is secured. A number of perforations, f, formed along the inner side and lower edge of said pipe afford communication between its interior and the interior of the pan. Upon the outer side of one of the ends A' is provided a half-funnel, G, which is open at its upper end, and at its lower end, which is about upon a line with the lower side of the pipe F, opens into the latter. From one end of the opposite pipe, F, a pipe, H, extends along the side of the pan A to the opposite end, where it passes downward through the bottom.

As thus arranged, water for tempering purposes is admitted to the outer pan through the funnel and the cross-pipe, with which it is connected, and, passing along the entire length of said pan, passes into the opposite cross-pipe, and through the same and the pipe H, escapes into a waste-water receptacle, having, during such passage, abstracted from the contents of the inner pan a large percentage of its heat. The contents of the inner pan B are discharged through a pipe, I, which is rigidly attached to its lower side, and extends downward through an opening in the bottom of the outer pan. Immediately above the bottom of the outer pan a collar, i, is attached to the pipe I, and between the same and said bottom and around said pipe is placed a rubber gasket, L. A similar gasket, L', is placed around said pipe below said bottom, and a nut, I', screwed upward upon said pipe I, the lower end of which is threaded for such purpose.

It will be seen that by compressing the rubber gaskets between the collar i and the nut I', the opening through the bottom of the outer pan will be closed, so as to prevent the passage of water through the same. A pipe, K, passing through the bottom of the pan A at or near one end, enables the contents of the same to be entirely discharged, when desired. The inlet and outlet openings for water, and the discharge-opening for milk, being at one end, it is much more easy for the apparatus to be adjusted and operated than as ordinarily constructed.

The pan or vat is placed upon a rectangular frame, M, which corresponds in width with the pan, and has nearly the length of the same, and at each end is provided with a bolster, N, which is fitted to the transverse shape of the bottom of said pan, and, embracing its rounded corners, insures the relative horizontal positions of said parts. A metal bar, O, having the form of a round arch, is secured to the transverse center of the frame M at each end, and, extending downward and outward, has its ends turned horizontally outward, so as to form suitable bearings or feet $o$, upon which the whole device rests.

Having thus fully set forth the nature and merits of my invention, what I claim as new is—

1. The milk-pan B, with pipe I, having a collar and gaskets, and the cooler A, with pipes H and K and feed-spout G, said milk and water pipes opening downward through the bottom of the cooler, and arranged as set forth.

2. The frame M, provided with the bolsters N, the legs O, and the feet $o$, in combination with the tempering-vat, substantially as and for the purpose shown and described.

In testimony that I claim the foregoing I have hereunto set my hand.

EDWIN C. BROOKS.

Witnesses:
A. H. GOODWIN,
FRANK DIEL.